Oct. 7, 1924.
G. R. WATSON
DRILL BIT SHAPER AND SHARPENER
Filed Jan. 2, 1924
1,510,726
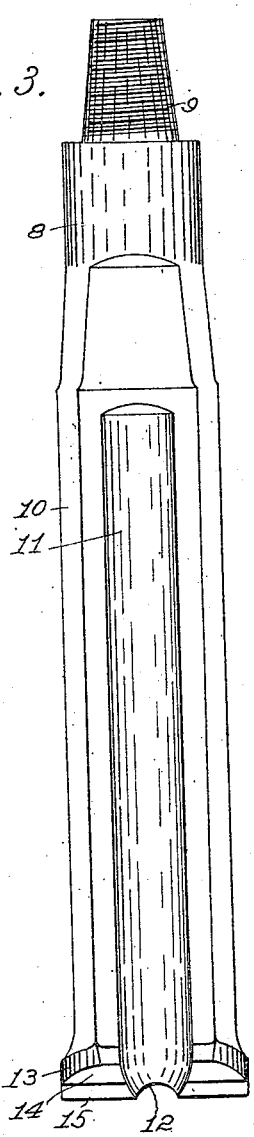
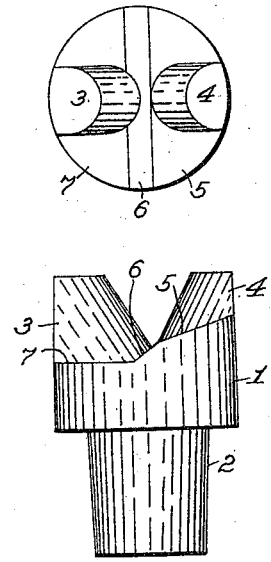
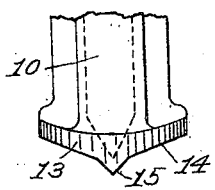
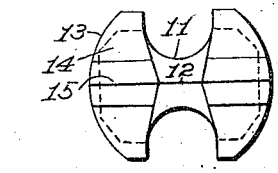
Inventor,
G. R. Watson, by
Attorney.

Patented Oct. 7, 1924.

1,510,726

UNITED STATES PATENT OFFICE.

GEORGE R. WATSON, OF WATERLOO, IOWA, ASSIGNOR TO ARMSTRONG MANUFACTURING COMPANY, OF WATERLOO, IOWA.

DRILL-BIT SHAPER AND SHARPENER.

Application filed January 2, 1924. Serial No. 684,081.

*To all whom it may concern:*

Be it known that I, GEORGE R. WATSON, a citizen of the United States of America, and a resident of Waterloo, Black Hawk County, Iowa, have invented certain new and useful Improvements in Drill-Bit Shapers and Sharpeners, of which the following is a specification.

My invention relates to improvements in drill-bit shapers and sharpeners, and the object of my improvement is to supply a shaping die for the cutting end of a well-drill, which will be operable to sharpen it at the same time that it is shaping it.

This object I have accomplished by the means which are hereinafter shown and described, and in the drawings of which Fig. 1 is a side elevation of the shaping and sharpening die and Fig. 2 is a plan of its terminal face. Fig. 3 is a side elevation of a well-drill whose cutting bit is shaped by said die, Fig. 4 is an elevation of the bit only thereof taken at an angle of ninety degrees to Fig. 3, and Fig. 5 is a plan view of the cutting end of said bit.

The die shown may be of any dimensions and varied considerably in form without departing from my invention.

The drill shown is of the type used in drilling deep wells in rocky strata, and is designed to function effectively notwithstanding cracks and crevices in the stratum which may traverse the spot which it is drilling into.

To do this most efficiently, a type of drill 8 shown in Figs. 3 to 5 inclusive is used, having longitudinal oppositely positioned semi-cylindrical grooves or troughs extending to its bit terminal to an anticlinal arcuate central or axial transverse edge at 12 between transverse alined radial anticlinal ridges 15 the latter preferably being inclined in their anticlinal faces toward each other at or about ninety degrees.

The end face of the bit is also shaped to have at opposite sides of the anticlinal ridge or cutter 15 the anticlinal faces or zones 14 whose faces are inclined toward each other at a greater angularity than the said angle of the ridge 15, and the bit is bounded semi-circularly at 13 at opposite ends of the said anticlinal ridge and faces 15 and 14 to permit it to properly center in the drill-hole while drilling.

The longitudinal troughs 11 in the drill body 10 serve as conduits for water circulating in the drill-hole in the removal of the tailings or comminuted rocky débris resulting from the drilling. The drill 8 has at its opposite end a coned threaded shank 9 for detachable mounting on a drill-jar or the like.

My improved die has a head 1 with coned shank 2 for reception in a socketed hammerhead of the usual type not shown actuated for to and fro reciprocation by any appropriate mechanism. Its shaping terminus has a middle diametral plane or zone 6 having an inclination of the desired angle of shaping of the ridge 15 of said drill, that is, at or near an angle of forty-five degrees relative to the axis of the drill. This inclined plane 6 is positioned between oppositely located planes 7 and 5, of which the plane 7 may be at a right angle relative to the axis of the drill, while the plane 5 should be at an angle relative to said axis such as that of the two anticlinal planes 14 of said drill.

Said die-head 1 has a pair of synclinal oppositely positioned projections of segmental cylindrical contour at 3 and 4 arranged on a diameter of the die-head but with separated roots, the root of the projection 3 being at the middle line of the diametral plane 6, while the root of the other projection 4 is at the adjacent longitudinal limit of said plane 6. The projection 3 rises from the plane 7 and the other projection rises from the middle of the inclined plane 5. These projections also serve as guide members during the action of the die upon the heat-softened bit-end of the drill by entering the previously formed troughs or grooves 11 thereof.

It has been found in practice, that where a die-head is shaped with a transverse synclinal groove into which the bit substance must be forced to provide it with a cutter of the desired angularity and sharpness, that the frictional drag upon the fibrous metal of the bit draws the substance of the latter sufficiently as to not fill the groove of the die, so that the bit when completed is not sharp and must be reheated and submitted to additional working and pressure from the sides by means of other appliances to bring the cutter to a sharp edge. My improved die construction is such as to effectuate both the shaping and the sharpening of the bit at one operation. The drill body 8—10 having been placed in some convenient supporting device which will keep its axis alined with that of the reciprocatory die 1, and so that the drill may be rocked from side to side by the operator, the die is permitted to impinge upon the bit end of the drill a number of times, so that the diametral zone 6 may shape the cutter ridge 15 along one face to the desired angularity, then the drill is rocked half way around so that the zone part 6 may act upon the opposite face of the bit cutter 15 in reducing it to the same angularity, in the course of which operations the fibers of the part 15 are not dragged bodily back, but are by the above described alternated operations pressed into shape to render the ridge truly sharp throughout and in all its parts or length on opposite sides of the drill end and the troughs 11. The inclined planar face 5 simultaneously shapes the anticlinal faces 14 of the bit as the die acts alternately thereon when the drill is rocked. The projection 3 also shapes the angle at 12 between the terminal ends of the grooves 11, but the other projection 4 being offset from the middle line of the die part 6 only serves as a guide in entering the alined groove 11 of the drill.

Having described my invention, what I claim as new, and desire to secure by Letters Patent, is:

1. A die of the character described having a forming terminal shaped with three flat surfaces, of which a middle surface is inclined to the axis of the die to shape one sloping side of an anticlinal cutter, and one of the other surfaces coterminous therewith is inclined at a different angle to the axis to shape an inclined crushing face of said cutter, said die having terminal guide projections.

2. A die of the character described having a forming terminal shaped with three flat surfaces of which the middle one is diametrically positioned at an angle to the axis of the die, another surface is coterminous with and at a different inclination to said axis, and the third surface is at a right angle to said axis, said die having spaced terminal guide projections.

3. A die for shaping a drill-bit whose shaping end has a diametrical inclined part between other parts inclined thereto, and having oppositely positioned synclinal projections spaced apart, one having its root extending to the middle longitudinal line of said diametrical inclined part, and the other projection having its root extending to the adjacent limit of said part.

4. A die for shaping a drill-bit whose shaping end has a diametrical inclined part between other parts inclined thereto, and having oppositely positioned synclinal segmental cylindrical projections spaced apart, one having its root extending to the middle longitudinal line of said diametrical inclined part, and the other projection having its root extending to the adjacent limit of said part.

Signed at Waterloo, Iowa, this 5th day of Dec., 1923.

GEORGE R. WATSON.